US007693785B1

(12) United States Patent
Drysdale

(10) Patent No.: US 7,693,785 B1
(45) Date of Patent: Apr. 6, 2010

(54) METHOD AND DEVICE FOR PERFORMING CARD TRANSACTIONS

(75) Inventor: Ian M. Drysdale, Coral Springs, FL (US)

(73) Assignee: First Data Corporation, Greenwood Village, CO (US)

( * ) Notice: Subject to any disclaimer, the term of this patent is extended or adjusted under 35 U.S.C. 154(b) by 599 days.

(21) Appl. No.: 09/466,271

(22) Filed: Dec. 17, 1999

(51) Int. Cl.
*G06Q 40/00* (2006.01)
(52) U.S. Cl. .......................... 705/39; 705/40
(58) Field of Classification Search .............. 705/41, 705/39–40, 26, 44, 42
See application file for complete search history.

(56) References Cited

U.S. PATENT DOCUMENTS

| 5,844,219 | A | | 12/1998 | Wallner |
| 5,850,442 | A | * | 12/1998 | Muftic .......................... 380/21 |
| 5,987,498 | A | * | 11/1999 | Athing et al. ................ 709/203 |
| 6,128,602 | A | * | 10/2000 | Northington et al. .......... 705/35 |
| 6,324,525 | B1 | * | 11/2001 | Kramer et al. ................. 705/40 |

FOREIGN PATENT DOCUMENTS

WO    WO 00/19426    *    4/2000

OTHER PUBLICATIONS

Arthur Fuller, Verify this!, Databased Web Advisor, v15, n7, p. 10.*
First Ecom.com provides quick internet credit card solution, Asia computer Weekly, May 17-23, 1999, p. 3.*
Clear Communications launches payment gateway service that can process online , Newsbytes News Network, Oct. 22, 1999.*
Sheridan Nye, Small but perfectly formed, Communications International, v26, n11, pp. 24-32, Jan. 1999.*
Hughes installing hybrid VSAT network for Chevron, Communications News, v28, n3, p. 9, Mar. 1991.*
News in Brief, Cards International, Jun. 9, 1999.*
General Instrument's Digital Interactive Cable TV Set-Top Terminals to Become the Latest New Acceptance Device For Smart Cards. PR Newswire. New York. Dec. 10, 1998. p. 1.*
Booker, Ellis. New System A Welcome Guest at Hyatt. Computerworld. vol. 25, iss. 28. Jul. 15, 1991. pp. 51-53.*

* cited by examiner

*Primary Examiner*—Jason M Borlinghaus
(74) *Attorney, Agent, or Firm*—Sutherland Asbill & Brennan LLP

(57) ABSTRACT

A method of performing a card transaction includes accessing a web server using a point of service terminal having a web browser and a card reader, wherein the web server includes commands for obtaining authorization of the transaction; entering a transaction card into the card reader in order to enter an account number associated with the card into the web server; responding to prompts generated by the web server using the terminal; and obtaining authorization for the transaction through the web server.

19 Claims, 2 Drawing Sheets

METHOD AND DEVICE FOR PERFORMING CARD TRANSACTIONS

TECHNICAL FIELD

The invention relates to a method and device for performing a card transaction using the Internet to facilitate processing of the transaction.

BACKGROUND ART

Many transactions, such as sales transactions, involve consumers that use charge cards, credit cards, debit cards and the like. Such transactions may be collectively referred to as card transactions. Typically, merchants must obtain authorization for these transactions and/or transmit information regarding the transactions to another entity, such as a merchant service provider.

A prior method of performing a card transaction involves using a point of service terminal that has proprietary operating system software of a particular merchant service provider installed thereon. The terminal also typically has other proprietary software for performing such functions as fraud evaluations and report printing. The terminal is used to access a proprietary network of the merchant service provider, and to transmit information regarding the transaction to the network in order to obtain authorization for the transaction.

Because this method utilizes proprietary software and a proprietary network, this method involves significant capital costs. In addition, because the software is installed directly on the terminal, any revisions to the software must be downloaded to or otherwise installed on the terminal. Such revisions are therefore time-consuming and costly to perform. Furthermore, installation of some software revisions may be delayed or never accomplished. Consequently, the terminal may not perform all functions required for a particular transaction.

Another prior method of performing a card transaction involves a consumer using a personal computer to access a web site of a particular merchant. The consumer may then purchase items from the web site by entering a credit card number into the web site using a key pad of the personal computer. Because the personal computer is not a dedicated point of service terminal, however, such a method is inefficient for performing transactions at merchant locations.

DISCLOSURE OF INVENTION

The invention overcomes the shortcomings of the prior art by providing a method and device for performing a card transaction using the Internet to facilitate processing of the transaction, wherein the method and device involve a card reader for receiving a transaction card. Because neither a proprietary operating system nor a proprietary network are required, this method is less costly than prior methods that involve such systems and networks.

Under the invention, a method of performing a card transaction includes accessing a web server using a transaction device, wherein the web server includes commands for processing the transaction; and entering a transaction card into a card reader of the transaction device in order to enter transaction information associated with the card into the web server.

The method may further include entering additional transaction information into the web server using a touch-sensitive screen of the transaction device and/or a keypad of the transaction device.

Preferably, the method includes displaying information on a display device of the transaction device. Advantageously, the display device may be used to display an advertisement, an electronic coupon or other information downloaded from the web server and/or other site on the Internet. Consequently, the method of the invention provides far greater access to all types of information compared with prior methods.

In addition, the method may include obtaining authorization for the transaction through the web server. Furthermore, because the commands for obtaining such authorization are preferably included in the web server, the commands may be easily updated and/or revised as necessary.

Further under the invention, a point of service terminal for performing a card transaction includes a central processing unit having a web browser for accessing a web server on the Internet. The terminal also includes a card reader in communication with the central processing unit for receiving a transaction card and entering transaction information associated with the card into the web server.

Preferably, the terminal further includes a data entry device, such as a keypad, in communication with the central processing unit for entering additional transaction information into the web server. The terminal may also include a display device in communication with the central processing unit for displaying information downloaded from the Internet. Advantageously, the display device may include a touch-sensitive screen for entering additional transaction information into the web server.

These and other objects, features and advantages of the invention are readily apparent from the following detailed description of the best mode for carrying out the invention when taken in conjunction with the accompanying drawings.

BEST MODE FOR CARRYING OUT THE INVENTION

Figure 1:
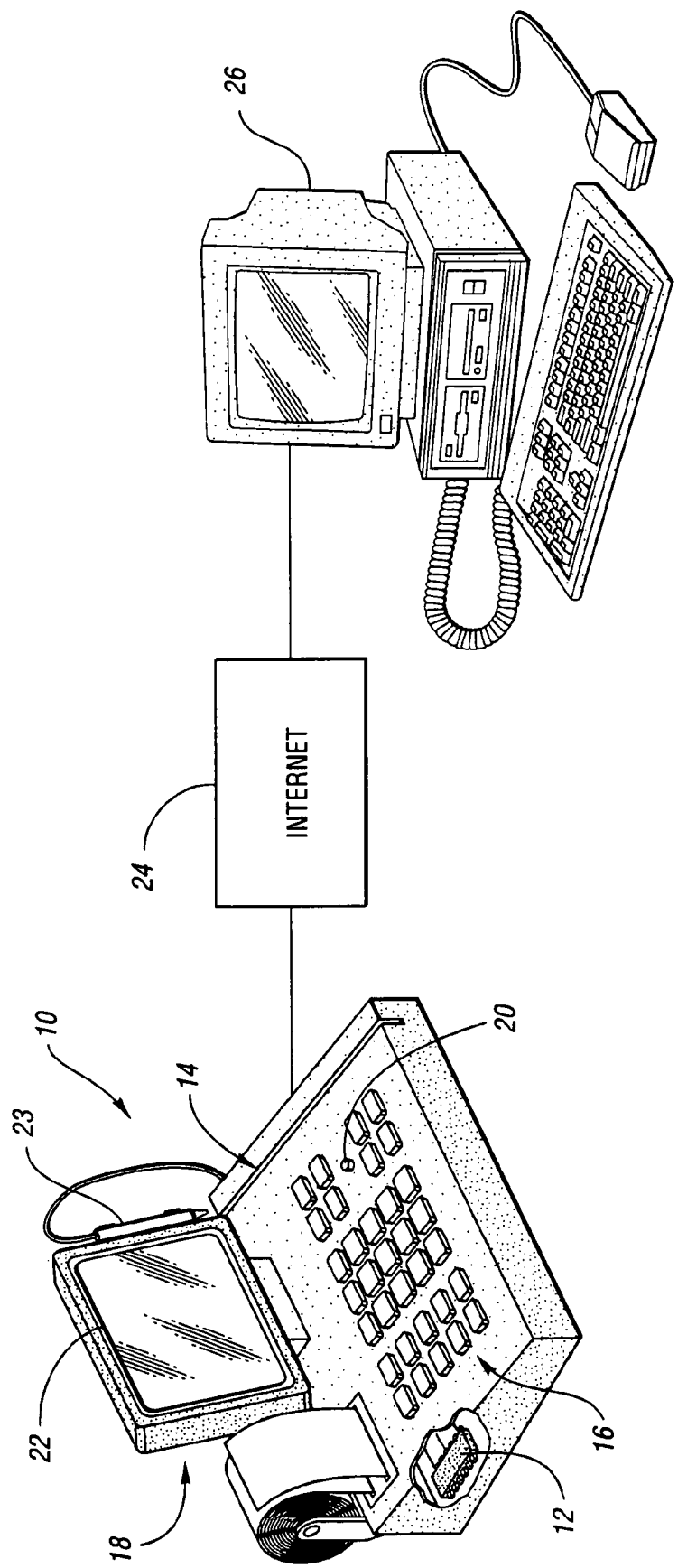
FIG. 1 is a schematic diagram of a transaction device for performing a card transaction according to the present invention; and invention.

FIG. 1 shows a dedicated transaction device or point of service terminal 10 for performing a card transaction according to the present invention. As used herein, the term "card transaction" refers to a transaction, such as a sale transaction, cash-advance transaction, and the like, that involves a charge card, credit card, debit card or other transaction card. The terminal 10 is preferably configured to be used at merchant or retail locations, such as stores, restaurants, lodging facilities, auto rental companies, hospitals, universities, and the like. Furthermore, the terminal 10 is used to transmit information to a financial services institution, such as a merchant service provider (MSP), and to obtain authorization for a transaction or transactions from the MSP as explained below in greater detail. The MSP may be a transaction acquirer or an agent of a transaction acquirer.

The terminal 10 includes a central processing unit or processor 12, and several peripheral devices in communication with the processor 12. For example, the terminal 10 may include one or more data entry devices, such as a card reader 14 and a keypad 16. Furthermore, the terminal 10 preferably includes a display device 18, which may also be configured as a data entry device as explained below in greater detail.

The card reader 14 is preferably configured to read magnetic strip cards as well as smart cards so that the terminal 10 can accommodate all types of charge cards, credit cards, debit cards and the like. The keypad 16 is preferably configured to receive alpha-numeric input, and is provided with an embedded mouse 20.

The display device 18 has a relatively large color screen 22 that is preferably at least 3 inches by 3 inches. Alternatively, the screen 22 may have any suitable size. The screen 22 may also be touch-sensitive so that a consumer, merchant or other operator can provide input to the terminal 10 by touching the screen 22. For example, a consumer may use his finger to select an appropriate response displayed on the screen 22. As another example, the terminal 10 may be provided with an electronic pen 23, which the consumer may use on the screen 22 to provide his signature.

The terminal 10 is adapted to be connected to the Internet 24 through an Internet Service Provider (ISP), such as AMERICA ON-LINE®, EARTH LINK®, and the like. Furthermore, the terminal 10 is preferably, but not necessarily, configured to transmit and receive data or information using the Transmission Control Protocol/Internet Protocol suite (TCP/IP).

The terminal 10 is also configured to communicate with the World Wide Web in order to access a particular web page on a web host or server of the MSP. Accordingly, the terminal 10 is preferably provided with a web browser such as NETSCAPE NAVIGATOR GOLD®, MICROSOFT INTERNET EXPLORER®, and the like. Alternatively, the web browser may be a program provided by the MSP or other financial services institution.

The web page and web server are preferably, but not necessarily, configured to transmit and receive data or information using TCP/IP. Furthermore, the web page and web server are preferably programmed in HYPERTEXT MARKUP LANGUAGE® (HTML), and include commands for processing transactions initiated through the terminal 10. For example, the web page and/or web server may include commands for transmitting information between the terminal 10 and the web page and/or web server. Preferably the web page and/or web server includes all commands necessary to obtain authorization of transactions initiated through the terminal 10. Advantageously, then, the terminal 10 need not include any proprietary software of the MSP in order to complete transactions. Furthermore, because the terminal 10 accesses the Internet 24 through an ISP, instead of accessing a proprietary network of the MSP, the terminal 10 need only include software necessary to access the Internet.

The MSP also has a central data base or host computer 26 adapted to be connected to the Internet 24 in order to communicate with the web server. The host computer 26 may be used to download information regarding transactions initiated through the terminal 10 and/or other terminals. The host computer 26 may also be used to update or otherwise revise the transaction commands on the web page and/or web server. Advantageously, such updates and/or revisions need not be downloaded to the terminal 10 or other terminals.

Figure 2:
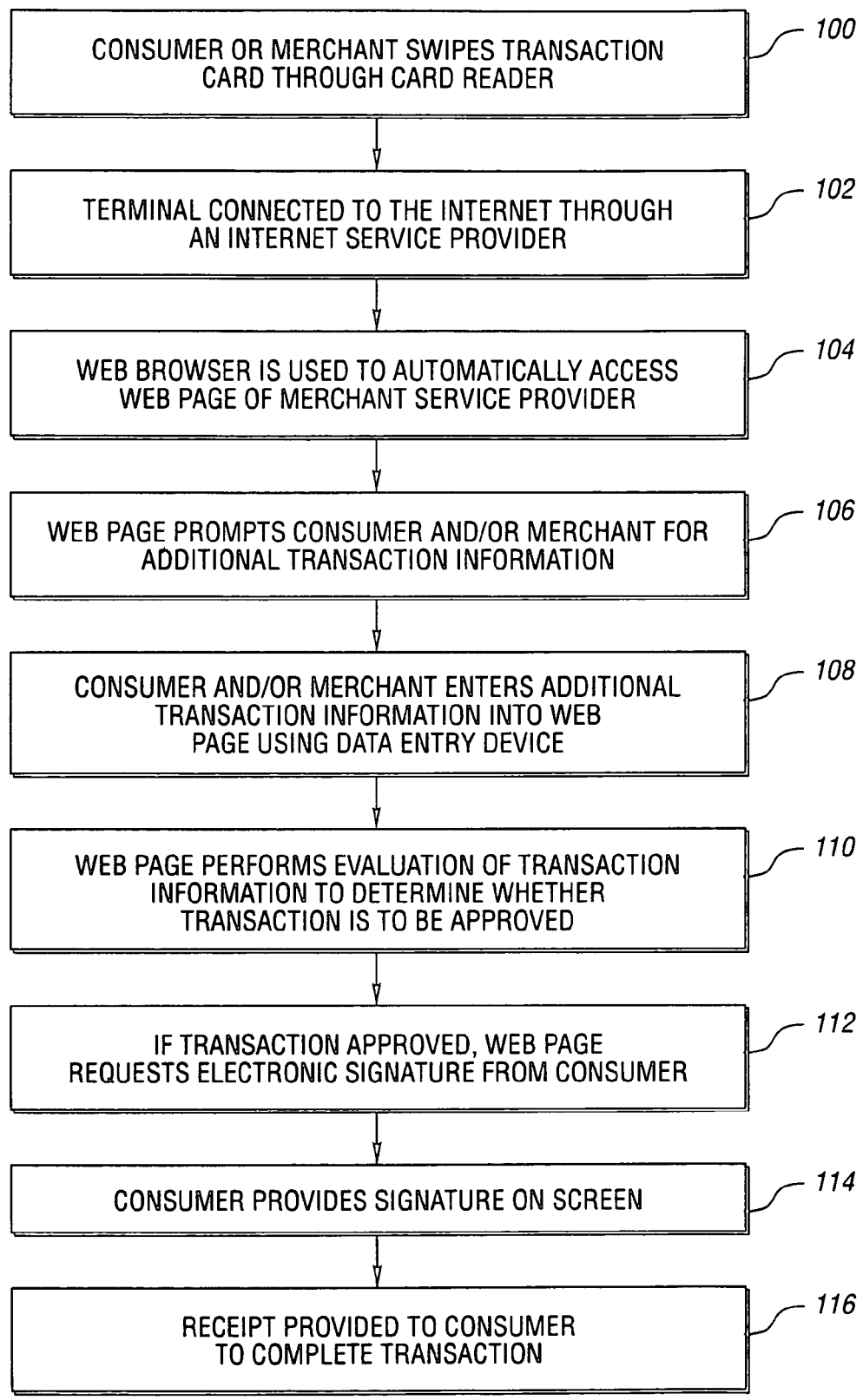
FIG. 2 is a flow chart illustrating operation of the method of the invention.

FIG. 2 is a flow chart illustrating operation of a method for performing a card transaction using the terminal 10. At step 100, a consumer or merchant swipes a transaction card, such as a charge card, credit card, debit card, and the like, across the card reader 14 of the terminal 10 in order to enter an account number and/or other transaction information associated with the card into the terminal 10. Alternatively, the account number may be entered into the terminal 10 using the keypad 16. At step 102, the terminal 10 is connected to the Internet through a particular ISP using a dial-up connection, cable modem, Asymmetric Digital Subscriber Line (ADSL), T1 connection or any other suitable communication path. Next, at step 104, the web browser installed on the terminal 10 is used to automatically, or otherwise, access the web page on the web server of the MSP. Alternatively, the card may be swiped across or otherwise entered into the card reader 14 at any time during the transaction process, such as after the terminal 10 has gained access to the web page.

At step 106, the web page and/or web server may then prompt the consumer and/or merchant for additional transaction information, or confirmation of transaction information already transmitted to the web page and/or web server, by displaying suitable requests on the display device 18. For example, the web page and/or web server may request confirmation of a transaction dollar value that was previously entered into the terminal 10 or into a cash register or similar device that is in communication with the terminal 10. The consumer and/or merchant may then enter additional transaction information into the web page and/or web server using the keypad 16, touch-sensitive screen 22 and/or other data entry device, as indicated at step 108.

Next, at step 110, the web page and/or web server performs an evaluation of the transaction information to determine whether the transaction is to be approved. If the transaction is approved, the web page and/or web server may request an electronic signature from the consumer at step 112. The consumer may then provide his signature on the screen 22 using the pen 23, as indicated at step 114. If the transaction is not approved, then a message indicating such status may be transmitted from the web page and/or web server to the terminal 10. Once the signature of the consumer has been obtained, a receipt may be provided to the consumer to complete the transaction, as indicated at step 116.

According to a feature of the invention, the web page and/or web server of the MSP may be configured to transmit additional information to the terminal 10, such as help screens, e-mail, advertisements, and electronic coupons. Such information may be transmitted automatically to the display device 18, or as requested by the consumer or merchant. Because the web page and web server are programmed in HTML, the web page and web server may also be used to quickly link the consumer and/or merchant to related destinations or addresses on the World Wide Web.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of performing a transaction using a transaction card, the method comprising:

accessing a web server of a merchant service provider via an Internet service provider using a transaction device during a transaction involving a transaction card, wherein the transaction device processes a charge card, a credit card, or a debit card, wherein the web server includes commands for processing transaction information associated with the transaction card to obtain authorization from the merchant service provider for the transaction;

entering the transaction card into a card reader of the transaction device in order to enter transaction information associated with the transaction card into the web server during the transaction; and entering confirmation of a previously entered transaction dollar value in response to a prompt from the web server, wherein the transaction dollar value is entered via at least one data entry device;

wherein the transaction device does not utilize any merchant service provider proprietary software or any merchant service provider proprietary network for the transaction information and confirmation of the previously entered transaction dollar value to be processed to obtain authorization from the merchant service provider for the transaction;

wherein the transaction device accesses the web server without accessing any merchant service provider proprietary network.

2. The method of claim 1 wherein accessing a web server comprises accessing a web page of the web server, and wherein the web page includes commands for processing the transaction information.

3. The method of claim 1 further comprising entering additional transaction information into the web server via the transaction device.

4. The method of claim 3 wherein entering additional transaction information includes entering additional transaction information using a touch-sensitive screen of the transaction device.

5. The method of claim 3 wherein entering additional transaction information includes entering additional transaction information using a keypad of the transaction device.

6. The method of claim 1 further comprising displaying information on a display device of the transaction device.

7. The method of claim 6 wherein displaying information includes displaying an advertisement downloaded from the Internet.

8. The method of claim 6 wherein displaying information includes displaying an electronic coupon downloaded from the Internet.

9. The method of claim 1 further comprising updating the commands of the web server.

10. A method of performing a transaction using a transaction card, the method comprising:

during a transaction involving a transaction card, accessing a web server of a merchant service provider via an Internet service provider using a point of service terminal having a web browser and a card reader, wherein the web server includes commands for processing transaction information associated with the transaction card to obtain authorization from the merchant service provider for the transaction, wherein the card reader processes a charge card, a credit card, or a debit card;

entering the transaction card into the card reader in order to enter transaction information associated with the transaction card into the web server during the transaction, wherein the transaction information includes an account number associated with the transaction card;

responding to at least one prompts generated by the web server using the point of service terminal, wherein the at least one prompt requests confirmation of a previously entered transaction dollar value to be entered; and providing an indication of authorization for the transaction from the web server to the point of service terminal upon the web server obtaining authorization for the transaction from the merchant service provider;

wherein the point of service terminal does not utilize any merchant service provider proprietary software or any merchant service provider proprietary network for the transaction information to be processed to obtain authorization from the merchant service provider for the transaction;

wherein the point of service terminal accesses the web server without accessing any merchant service provider proprietary network.

11. A point of service terminal for performing a card transaction, the terminal comprising:

a central processing unit having a web browser for accessing a merchant service provider web server on the Internet during a transaction involving a transaction card, wherein the web server includes commands for processing transaction information associated with the transaction card to obtain authorization from the merchant service provider for the transaction;

a card reader in communication with the central processing unit for receiving the transaction card and entering transaction information associated with the transaction card into the web server during the transaction, wherein the card reader processes a charge card, a credit card, or a debit card;

a display device in communication with the central processing unit for receiving at least one prompt from the web server requesting confirmation of a previously entered transaction dollar value to be entered; and a data entry device in communication with the central processing unit for entering confirmation of the previously entered transaction dollar value;

wherein the point of service terminal does not utilize any merchant service provider proprietary software or any merchant service provider proprietary network for the transaction information to be processed to obtain authorization from the merchant service provider for the transaction;

wherein the point of service terminal accesses the web server without accessing any merchant service provider proprietary network.

12. The point of service terminal of claim 11 wherein the data entry device is in communication with the central processing unit for entering additional transaction information into the web server.

13. The point of service terminal of claim 12 wherein the data entry device is a keypad.

14. The point of service terminal of claim 11 wherein the display device is in communication with the central processing unit for displaying information downloaded from the Internet.

15. The point of service terminal of claim 14 wherein the display device comprises a touch-sensitive screen.

16. The method of claim 1 wherein the card transaction involves a smart card, a charge card, a credit card or a debit card.

17. The method of claim 1 wherein the transaction device comprises a point of service terminal at a merchant or retail location.

18. The method of claim 1 further comprising transmitting information to and from a merchant service provider via the transaction device and the web server.

19. The method of claim 4 further comprising providing an electronic signature using a pen and the touch-sensitive screen.

* * * * *